Patented Dec. 28, 1926.

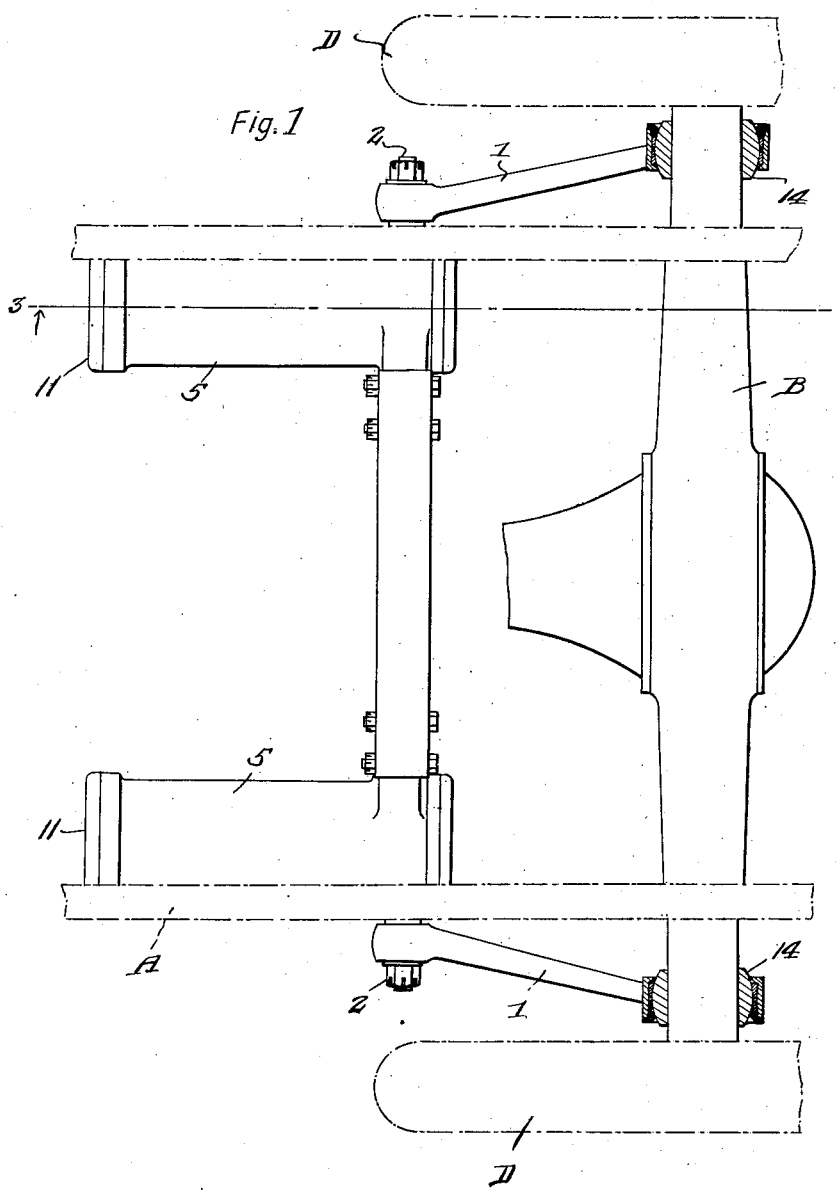

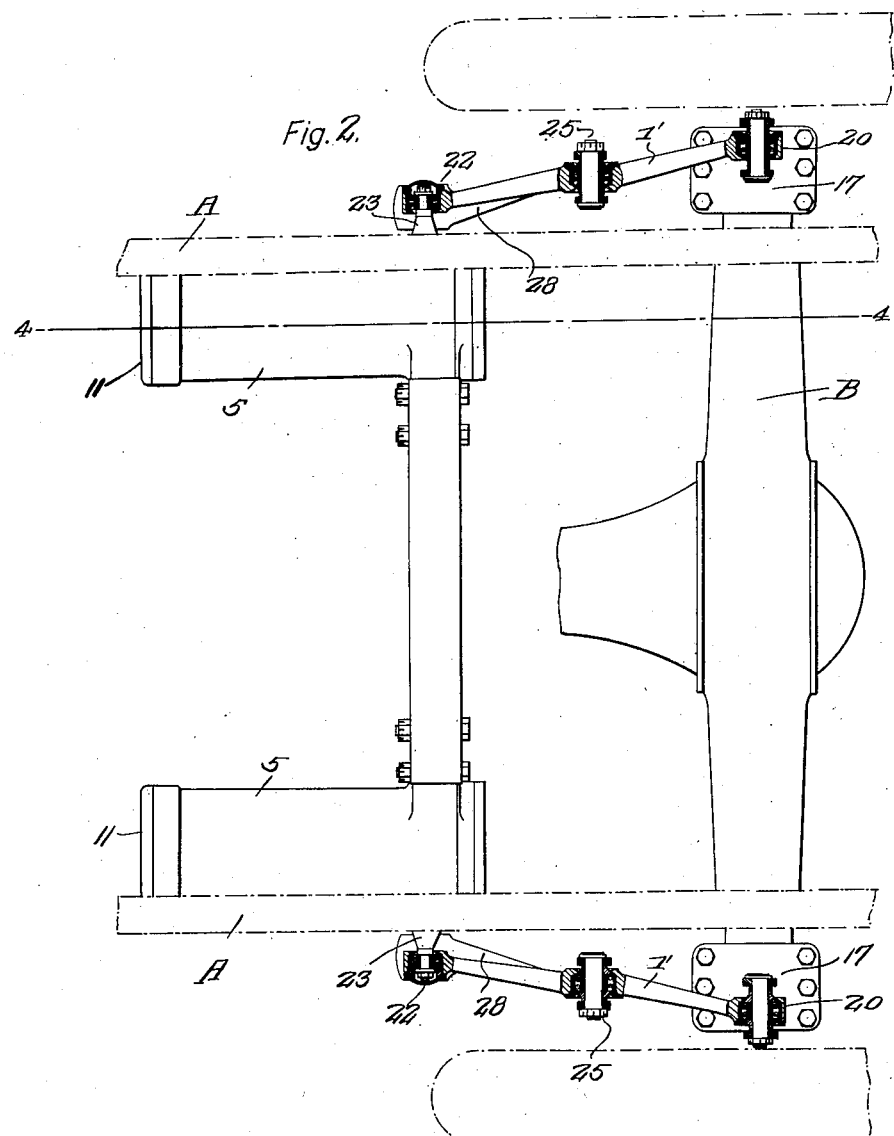

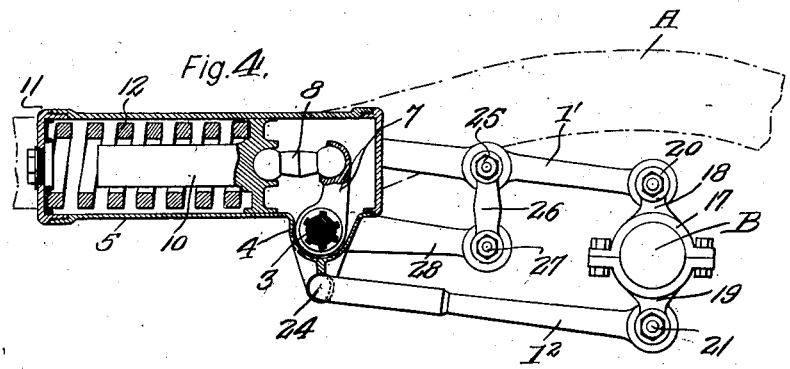
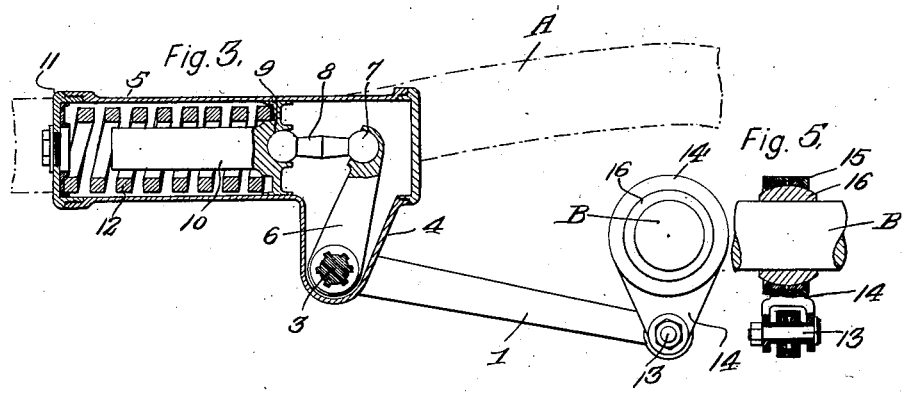

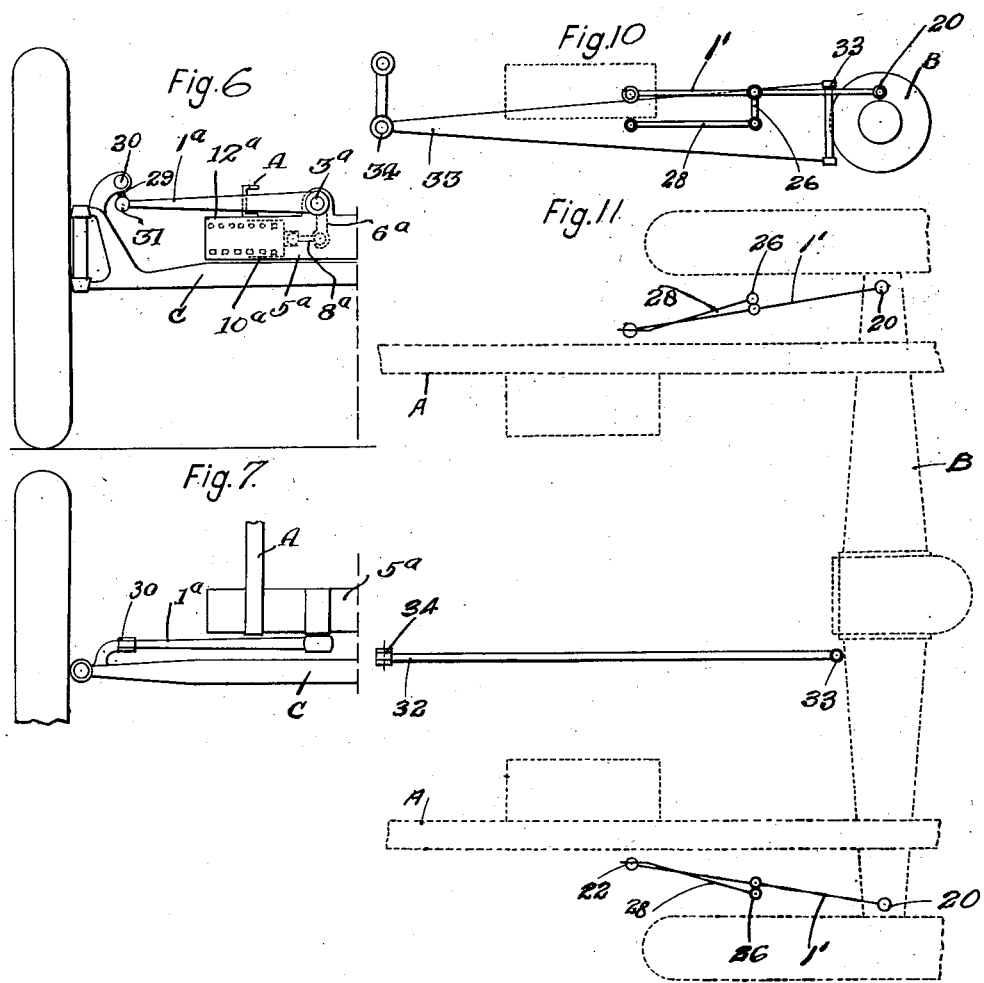

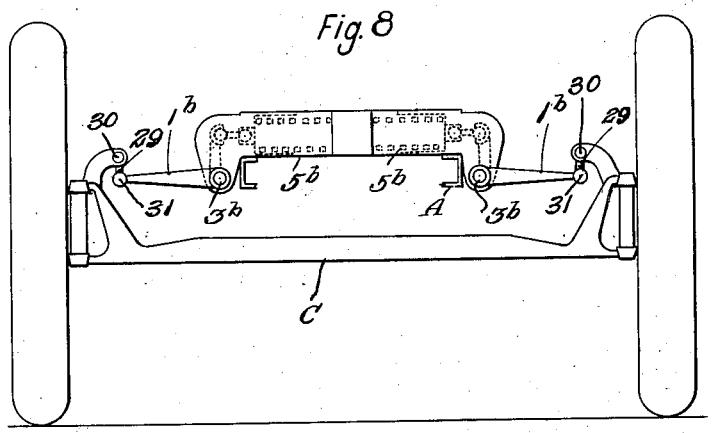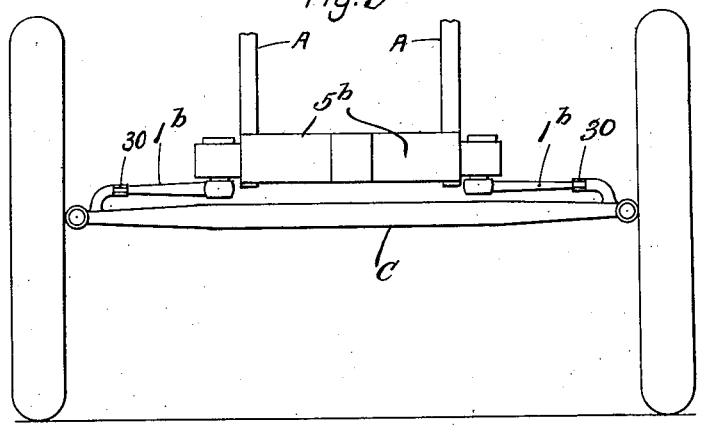

1,612,421

UNITED STATES PATENT OFFICE.

GEORGES HENRI ERNEST DE RAM, OF PARIS, FRANCE.

SUSPENSION OF AUTOMOBILES AND OTHER VEHICLES.

Application filed August 7, 1922, Serial No. 580,347, and in France August 10, 1921.

The present invention relates to certain improvements in suspension means for automobiles and other road vehicles, particularly of the types comprising a quadrilateral and in some cases a quadrilateral and a secondary one, operatively connected to compression spring plunger elements.

Attention is directed to my prior Patent No. 1,457,884 on which this present invention constitutes a further improved form of vehicle suspension.

It will be noted that, as in my previous patent, just referred to, the axle of the vehicle is connected to the chassis by arms, levers, etc., but in this present application the arms, levers, etc., are pivoted in such a manner as to permit limited lateral movement of the axle relative to the chassis. The axle is thereby free to follow all irregularities of the roadbed without interference, such as is common to spring suspension means heretofore in use, and with greatly improved riding qualities of the vehicle.

The object of my invention is, therefore, to provide improved suspension means for road vehicles which will permit limited lateral movement of the axle relative to the chassis in use.

A further object of my invention is to provide a device of this character which will positively fulcrum the axle relative to the chassis in use, and to provide resilient means which will operate wholly independently of each other, said operation being unimpaired by lateral strains imparted to the axle or chassis in use.

A still further object of my invention relates to various details of construction whereby improved vehicle suspension and resiliency are provided.

Referring now to the accompanying drawings which are made a part hereof, and on which similar reference characters indicate similar parts:

Fig. 1 is a top plan view, partly in section, of my improved suspension means shown as it would appear connected to the chassis of an automobile road vehicle.

Fig. 2 is a top plan view similar to that shown in Fig. 1, illustrating a slightly modified form of lever suspension and spring actuating means.

Fig. 3 is a side elevation, partly in section, of the form shown in Fig. 1, illustrating the suspension means and spring actuating means in detail and their relation to the chassis and axle of the vehicle.

Fig. 4 is a side elevation similar to that shown in Fig. 3, illustrating an elevation in modified form shown in Fig. 2.

Fig. 5 is a detail view, partly in section, of the axle suspension ball-and-socket bearing members and its connection with the suspension lever shown in Figs. 1 and 3.

Fig. 6 is a side elevation of a further modified form of my invention wherein the form shown in Fig. 1 is adapted for mounting transversely of the chassis to provide a long suspension lever.

Fig. 7 is a top plan view of the form shown in Fig. 6.

Fig. 8 is a side elevation similar to Fig. 6, illustrating a modified form of operating means, whereby a short suspension lever is employed.

Fig. 9 is a top plan view of the form shown in Fig. 8.

Fig. 10 is a diagrammatic view in side elevation of a slightly modified form of the device illustrated in Figs. 2 and 4. In this figure the usual torque arm is substituted for the short lever shown in Figures 2 and 4.

Fig. 11 is a top plan, diagrammatic view of the form shown in Fig. 10.

In the drawings, A represents diagrammatically the chassis of an automobile road vehicle, B the rear axle, C the front axle thereof, and D the vehicle wheels. All of these parts may be of any well-known or approved design or construction and need no particular description hereinafter.

In Figs. 1, 2, 3, 4, 10 and 11, I have shown my inventions applied to the rear axle of a road vehicle and in each instance the axle B is universally connected to the chassis A by arms or levers, swiveled to parts carried by the channel iron of the chassis A in such a manner as to permit limited lateral movement at each knuckle joint, thereby permitting the axle to freely follow all irregularities in road travel without interference and without imparting side-sway to the vehicle chassis.

In Figs. 1 and 3 the suspension lever 1 is operatively secured at one end to a stud 2 formed on the outer end of rock shaft 3, which is in turn journaled transversely in a lateral off-set chamber 4, communicating with one extremity of the cylindrical spring housing 5. Keyed on or otherwise attached to the rock shaft 3 within the offset chamber 4 and housing 5 is an arm 6 equipped at its free end with a socket 7 to receive one end of a universal connecting rod 8. The other end of the connecting rod 8 is journaled in a socket 9 in the outer face of a piston spring compressing element 10. The cylindrical housing 5 shown in each of the Figures 1, 2, 3, 4, 10 and 11 is positioned adjacent the inner face of the channel iron of the chassis A to extend parallel therewith and is provided with a removable head 11 between which and the piston element 10, a coil spring 12 is positioned.

The suspension lever 1 is universally connected at its other end by ball-and-socket bearing members 13 to the lower extremity of the arm 14. The arm 14 extends downward from an annular collar member 15 which is journaled on the annular arcuate bearing member 16 secured to the axle B as is clearly shown by reference to Fig. 5. Complete universal movement of the axle relative to the suspension lever 1 and chassis A is thus provided.

In Figs. 2 and 4 two suspension levers 1' and 1² are shown to positively connect the axle B to the chassis A in such manner as to resist the couple and transmit the thrust. In these figures an annular collar member 17 is secured on the axle B and is provided with diametrically oppositely extending arms 18 and 19. These arms 18 and 19 extend above and below the axle B respectively, and are provided with ball-and-socket bearing members 20 and 21 to which the levers 1' and 1² are respectively connected. The forward end of the lever 1' is provided with a ball-and-socket bearing member 22, which is journaled on the stud 23 projecting laterally from the channel iron of the chassis A and the forward end of the lever 1² is likewise journaled at 24 in a bearing formed in an extension of the offset member 4. The lever 1' is provided with a ball-and-socket bearing member 25 substantially midway between its ends from which a connecting link 26, journaled at one end in said bearing depends. The other ends of the link 26 is likewise journaled in a bearing 27 at the free end of the lever 28. As in the description of Figs. 1 and 2 the cylindrical spring housing 5 is provided with an offset chamber 4, through which a transverse rock-shaft 3 extends. The lever 28 is secured to one end of the rock shaft 3 in a manner similar to that shown in Figs. 1 and 2, and an arm 7 keyed to the rock-shaft 3 within the offset chamber 4 and cylindrical housing 5 is adapted to operate the piston element 10 against the tension of the coil spring 12, as will be readily understood from the foregoing. The modification just described differs from that shown in Figs. 1 and 2 in that the spring actuating lever 28 is operated through a link connection with the upper suspension and retaining lever 1', instead of being directly connected to the axle B and a torque lever 1² is so connected to the axle and the chassis as to form a joined parallelogram between the levers 1' and 1² whereby the axle is maintained parallel with itself under all operating conditions.

Referring now to Figures 6 to 9, inclusive, I have shown suspension means of the type previously described, but in these figures the various elements are mounted transversely of the chassis instead of parallel therewith. These Figures 6 to 9, inclusive, are shown more or less diagrammatic in form, inasmuch as the details of construction, such as ball and socket joints, etc., are identical with those previously described in connection with Figures 1 to 4, inclusive, and are intended primarily to disclose the adaptability of my improved suspension means to any type of construction of vehicle. In the modification shown in Figs. 6 and 7, the suspension means is indicated as employed between the chassis A and the front axle C, and comprises a lever 1ª connected to the axle C by a shackle 29 having ball and socket joints 30 and 31, the opposite end of said lever being fast to rock shaft 3ª journaled in housing 5ª, said shaft having fast thereto arm 6ª engaging connecting rod 8ª, which, in turn, engages piston 10ª of the compression spring plunger.

In Figs. 8 and 9, the housings 5ᵇ are reversed, so that the ends carrying rock shafts 3ᵇ overhang the side members of the chassis A and are connected to axle C by shorter levers 1ᵇ, but in other respects this form of suspension is similar to that shown in the preceding figures.

In Figures 10 and 11 is shown diagrammatically a slightly modified form of the suspension means shown in Figs. 2 and 4. In these figures, however, the torque arm 1² is eliminated where the vehicle to which my improved suspension is attached is provided with a torque arm 32. The torque arm 32 in this instance is pivotally connected to the axle B at 33 and is articulated between the channel iron of the chassis A to a universal connection 34 depending from the chassis A.

What I claim is:

1. In combination with the chassis and axles of a road vehicle, of suspension means connecting said chassis and axles, comprising levers connected to the axles and the chassis by ball and socket joints and compression spring elements carried by the chassis and operatively connected to said levers, whereby movement of the axles relative to the chassis is counteracted by a relatively slight compression of said spring elements.

2. In combination with the chassis and axles of a road vehicle, of suspension means connecting said chassis and axles, comprising compression devices carried by the chassis, levers connected to the axles and the chassis by ball and socket joints, and a rock shaft interposed between each compression device and the corresponding lever.

3. In combination with the chassis and axles of a road vehicle, of suspension means connecting said chassis and axles to form a joined parallelogram, said suspession means comprising levers connected to the axles and the chassis by ball and socket joints, and compression spring devices carried by the chassis and operatively connected to said levers.

4. In combination with the chassis and axles of a road vehicle, of suspension means connecting said chassis and axles to form a joined parallelogram, said suspension means comprising levers connected to the axles and the chassis by ball and socket joints, compression spring plungers fixed to the chassis, rocker arms pivoted adjacent said spring plungers and connected to said levers, and connecting rods interposed between said plungers and said rocker arms.

5. A suspension means for road vehicles comprising leverage pivotally connecting both the chassis and axle of the road vehicle by ball and socket joints, whereby lateral movement of the axle relative to the chassis is permitted.

In testimony whereof I affix my signature.

GEORGES HENRI ERNEST de RAM.